US005546946A

United States Patent [19]

Souquet

[11] Patent Number: 5,546,946
[45] Date of Patent: Aug. 20, 1996

[54] ULTRASONIC DIAGNOSTIC TRANSDUCER ARRAY WITH ELEVATION FOCUS

[75] Inventor: Jacques Souquet, Issaquah, Wash.

[73] Assignee: Advanced Technology Laboratories, Inc., Bothell, Wash.

[21] Appl. No.: 265,169

[22] Filed: Jun. 24, 1994

[51] Int. Cl.[6] .................................................. A61B 8/00
[52] U.S. Cl. ..................... 128/662.03; 310/368; 73/627
[58] Field of Search .......................... 128/661.01, 662.03; 310/322, 334, 336, 337, 367, 368; 73/627, 629

[56] References Cited

U.S. PATENT DOCUMENTS

| | | | |
|---|---|---|---|
| 3,086,195 | 4/1963 | Halliday . | |
| 3,964,014 | 6/1976 | Tehon . | |
| 4,586,512 | 5/1986 | Do-huu et al. | 128/661.01 |
| 5,099,459 | 5/1992 | Smith | 128/662.03 |
| 5,115,810 | 5/1992 | Watanabe et al. | 128/662.03 |
| 5,235,986 | 8/1993 | Masak et al. | 128/661.01 |

FOREIGN PATENT DOCUMENTS 0401027  5/1990  European Pat. Off. .

OTHER PUBLICATIONS

"Bow–Tie Transducers For Measurement of Anisotropic Materials in Acoustic Microscopy", Douglas A. Davids et al., Proc. 1986 Ultrasonics Symposium, pp. 735–740.
"Spatial Apodisation Using Modular Composite Structures", publ. in Proceedings of 1989 Ultrasonics Symposium at pp. 767–770 (1989).

*Primary Examiner*—George Manuel
*Attorney, Agent, or Firm*—W. Brinton Yorks, Jr.

[57] ABSTRACT

An ultrasonic diagnostic transducer array is provided for providing electronic focusing in the longitudinal plane and elevational focusing. Elements of the array are subdiced in the elevational direction to provide subelements with aspect ratios varying in proportion to their distance to the central longitudinal axis of the array. Such variation affords varying electro-mechanical coupling coefficients to the subelements such that the intensity of the transmitted energy is centered about the central longitudinal axis. In a second embodiment elements exhibit extensions in the elevational direction which vary in proportion to their displacement from the longitudinal center of the array. The extended elements are acoustically separated into subelements in the elevational direction to provide elevational focusing or spatial compounding of the transmitted acoustic energy.

22 Claims, 6 Drawing Sheets

ULTRASONIC DIAGNOSTIC TRANSDUCER ARRAY WITH ELEVATION FOCUS

This invention relates improvements in transducer arrays used for ultrasonic diagnostic imaging, and in particular to ultrasonic transducer arrays which are focused in the elevation direction.

The use of transducer arrays, in which a group of individual elements are electronically actuated and sampled to steer and focus a beam of ultrasonic energy, is well known. The elements of an array may comprise rings which are concentrically arranged to form an annular array. The present invention relates to linear arrays in which the elements are physically arranged in a straight line, conventionally used for linear array or phased array imaging. The linear array may also be curved in the dimension of the imaging plane so that the beams are concurrently mechanically spread in a fan shaped imaging plane. These linear arrays are ideal for scanning and forming images in a planar region in front of the array.

The longitudinal disposition of the array elements permits the beam of the array to be electronically focused into a narrow beam in the plane of the image. The single row of elements of the array does not enable electronic focusing in the transverse, thickness dimension of the plane, which is often desirable in order to obtain high resolution of a thin image "slice". The conventional technique for restricting the beam to a thin image plane is to mechanically focus the beam in this transverse, or elevational, dimension, either by contouring the elements in this dimension or lensing each element. More recently it has been shown that elevational focusing can be achieved by controlling the piezoelectric properties of the elements in this dimension. In this technique, known as shaded polarization, intense, gradated electric fields are uniformly applied to each element to taper the polarization of the piezoelectric elements so that they are most strongly polarized in the center and polarized to a lesser degree toward each end of the element in the elevational direction. The technique shapes the acoustic transmissivity of each element to be greater along the longitudinal center line of the array and lesser toward each elevational side. A significant disadvantage of the technique is the difficulty of precisely controlling the magnitude and gradient of the polarization shading.

It is also known to accomplish elevational focusing electronically, applying the same principle that is used to focus the beam longitudinally. Second, third, and additional rows of elements may be arranged along side and parallel to the first longitudinal row of elements. This forms individual rows of elements in the elevational direction and the timed actuation and sampling of these elements enables the electronic focusing of the beam in the elevational dimension. But it may be seen that the electronic approach greatly increases the complexity of the ultrasound system. The number of elements of the array will triple or better: a 128 element array becomes a two dimensional array of 384 or more elements. There is a corresponding increase in the number of transmitters and receivers required to operate the two dimensional array, which will greatly increase the cost of the system.

Accordingly, it is desirable to provide a transducer array which exhibits improved performance over conventional mechanical elevational focusing techniques, while avoiding the greatly increased cost and complexity of electronic elevational focusing.

In accordance with the principles of the present invention, a transducer array is provided for focusing of the ultrasonic beam in the elevational direction. In a first embodiment, the transducer array comprises a composite structure of elements of piezoelectric material and a bonding matrix of non piezoelectric material. The electro-mechanical coupling coefficients of the elements of piezoelectric material are controlled by controlling their respective aspect ratios in a manner such that elements along the longitudinal centerline of the array exhibit greater electromechanical coupling than do elements toward the longitudinal edges of the array. Control of the aspect ratios of the piezoelectric elements in the composite structure thereby affords a focusing of the acoustic beam in the elevational direction. In a second embodiment, the acoustic aperture of the transducer array is expanded longitudinally as the array is focused at increasing depths. As the aperture expands longitudinally by the addition of an increased number of active elements, the aperture is correspondingly expanded in the elevation direction. In a preferred embodiment, the expansion causes the acoustic aperture to be wider at the longitudinal ends of the array than in the center, and with the most longitudinal elements to be formed of laterally separated but electronically common subelements.

IN THE DRAWINGS

Figure 1:
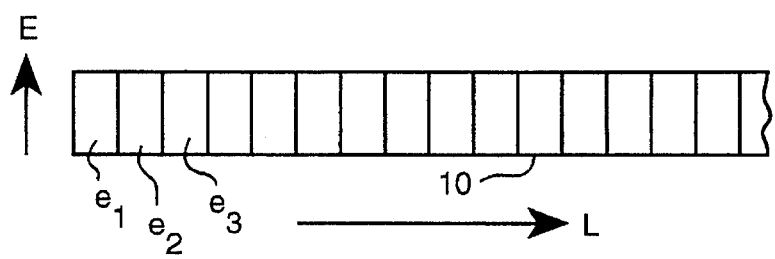
FIG. 1 is a top plan view of a linear array of piezoelectric transducer elements.

Referring first to FIG. 1, a conventional linear array 10 of piezoelectric transducer elements is shown. The array 10 is comprised of a plurality of individual transducer elements labeled $e_1$, $e_2$, $e_3$, and so forth in the drawing. The drawing also indicates two orientations of the array, the longitudinal direction shown by arrow L, and the elevational direction shown by arrow E. The plane in which the array operates projects outward from the center of the face of the array, in parallel with the longitudinal arrow L. As is well known, the transmitted beam emitted in the operating plane can be focused in the longitudinal direction by actuating elements in a group of elements at nearly simultaneous but slightly different times. Through such timed ultrasonic transmission the emitted beam can be focused to a desired point or steered in a desired direction.

Such focusing or steering is not possible in the elevational direction, however, as there is only a single element in the elevational direction. Electronic steering and focusing in the elevational direction requires additional rows of elements, which provides a two dimensional array and increases the complexity of the driving and receiving electronics by a significant factor. For a single row, the only practical elevational focusing to be obtained is through mechanical effects such as curving or lensing the array in the elevational direction as described in U.S. Pat. No. 3,936,791, or through the technique of shaded polarization referred to previously.

Figure 2:
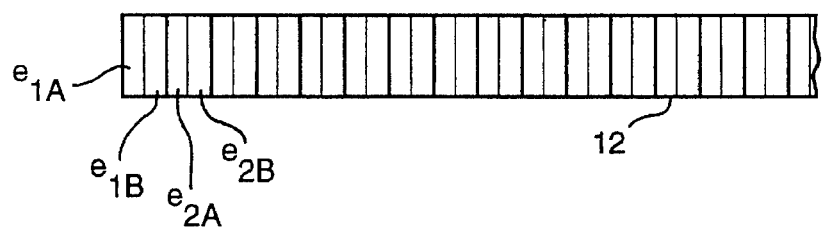
FIG. 2 is a top plan view of a linear array of piezoelectric transducer elements in which each element has been subdiced.
Figure 2A:
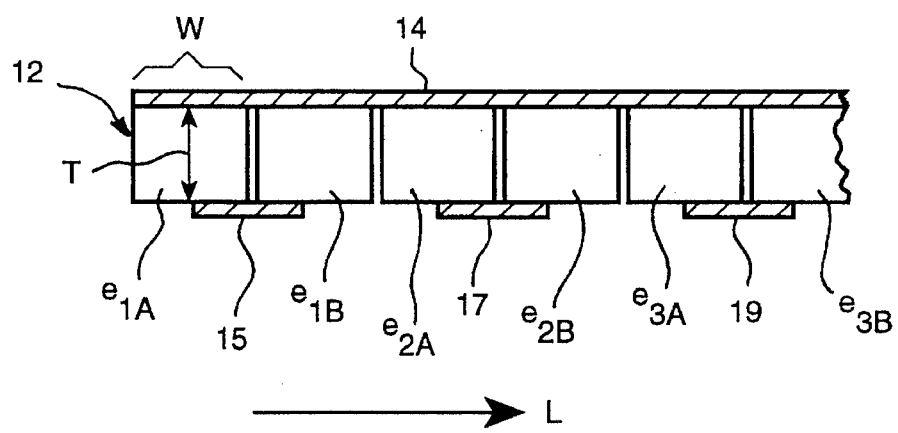
FIG. 2A is an enlarged edge view of the subdiced array of FIG. 2.

FIG. 2 shows a plan view of the transmitting surface of a transducer array 12 similar to the array of FIG. 1, but with each element subdiced. A side view of the array of FIG. 2 is provided in FIG. 2A, which further shows the reference potential electrode 14 on the emitting surfaces of the elements and the actuating electrodes 15, 17, 19 on the opposing surfaces of each pair of subdiced elements. In array 12 each element corresponding to $e_1$, $e_2$, etc. of FIG. 1 has been subdiced into two subelements, such as $e_{1A}$ and $e_{1B}$; $e_{2A}$ and $e_{2B}$; and so forth. From a comparison of FIG. 2 to FIG. 1, it is seen that the transmitting surface area of each subdiced element is half that of each original full element, which changes the aspect ratio of each discrete element. The aspect ratio change of significance to the performance of each element is the ratio of the transmitting surface width, indicated by W in FIG. 2A, to the thickness of the element between the electrodes, indicated by the arrow marked T in FIG. 2A. It is this ratio which determines the electromechanical coupling coefficient of the element, which is the magnitude of acoustic energy that will result from a given quantum of actuating energy. In the array 12, it is desired to create mechanical action in the direction of the thickness dimension T in order to transmit an acoustic wave outward from the transmitting surface of the elements. As the aspect ratio is varied, the transfer of electrical energy into mechanical acoustic energy is improved, as measured by an enhancement of the electro-mechanical coupling coefficient of the element. With other factors being equal, it is to be expected that the subdiced elements $e_{1A}$ and $e_{1B}$ would more efficiently convert electrical energy into acoustic energy than would the corresponding element $e_1$ of FIG. 1. The array 12 is operated by actuating the subdiced pairs together, which is the reason that the energizing electrodes 15, 17, 19 bridge pairs of subdiced elements.

Figure 3:
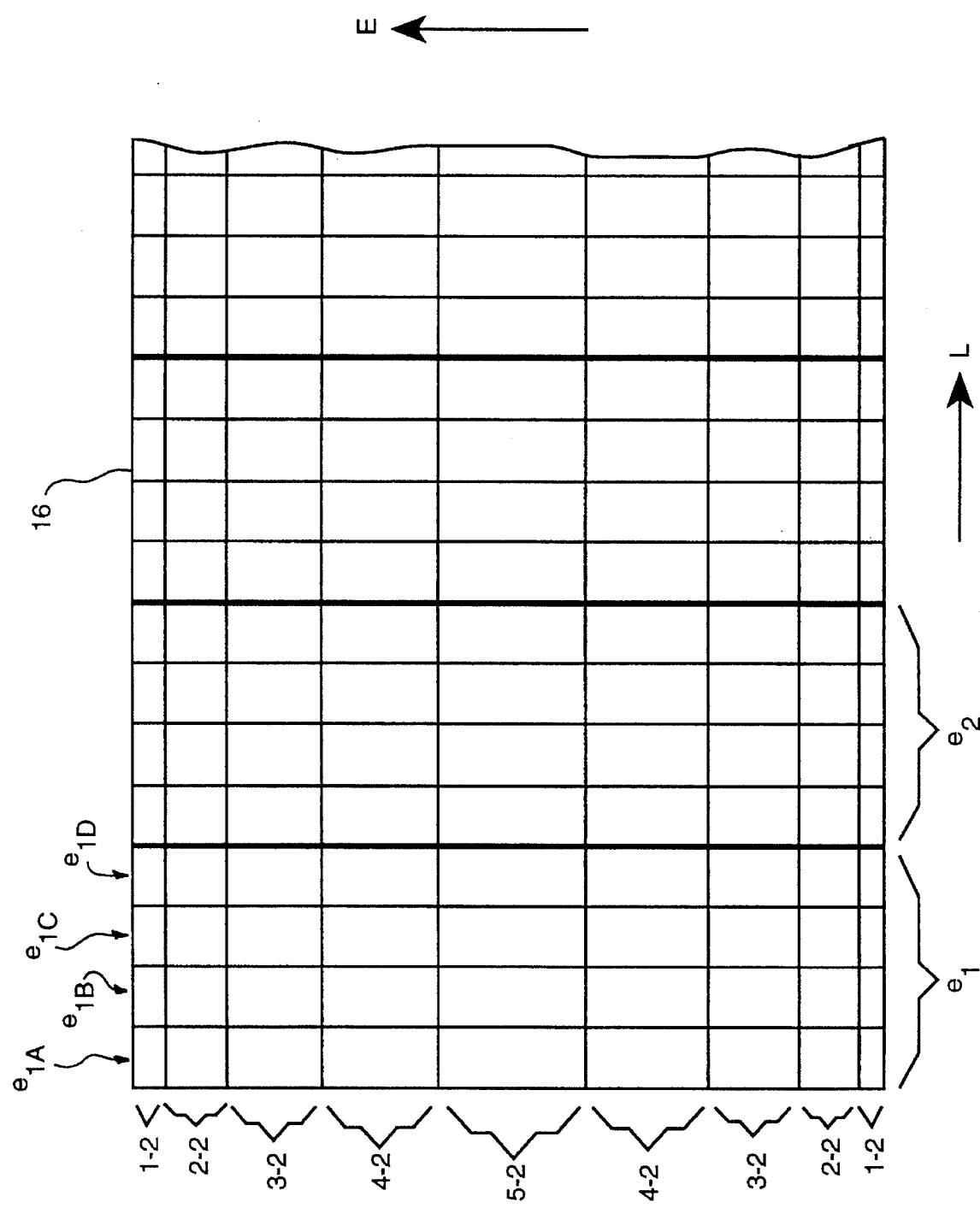
FIG. 3 is a top plan view of a transducer array which is focused in the elevation direction in accordance with the principles of the present invention.
Figure 4:
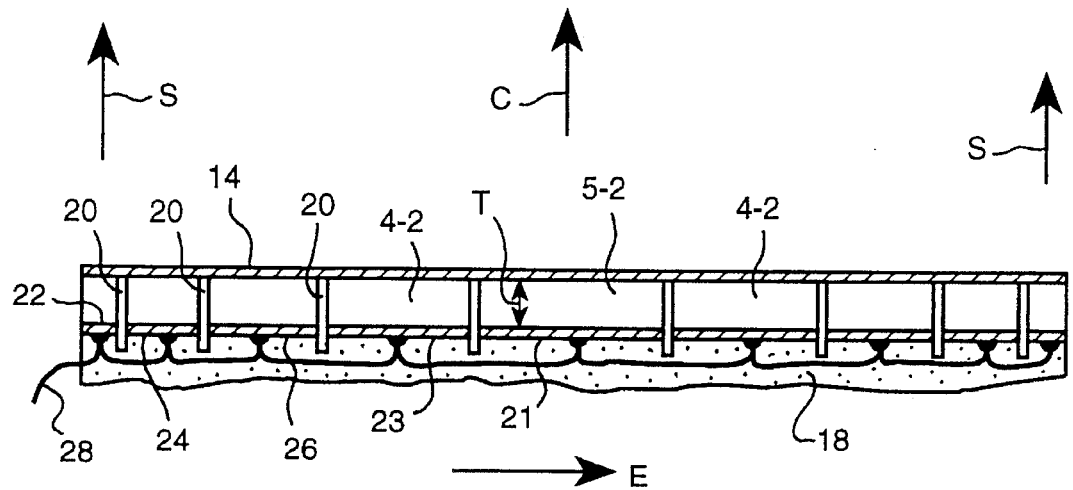
FIG. 4 is a side view of the transducer array of FIG. 3.

In accordance with the principles of the present invention, the electro-mechanical coupling coefficient of elements of a transducer array of composite material is varied in the elevational direction in order to achieve a transmitted energy profile which is focused in the elevation direction. A composite transducer is one in which piezoelectric material is suspended in a non piezoelectric matrix. A transducer array 16 which illustrates the application of these principles is shown in FIGS. 3 and 4. In the plan view of the transmitting surface of the array 16 of FIG. 3, the array 16 is comprised of a number of elements $e_1$, $e_2$, and so forth. Each element is subdiced in the elevational direction into four subelements. Element $e_1$ is subdiced in four subelements $e_{1A}$, $e_{1B}$, $e_{1C}$, and $e_{1D}$. As in the case of array 12, this subdicing improves the electro-mechanical coupling coefficient of the element $e_1$ in comparison with operation of the element as a single, unitary structure. The manner in which the aspect ratio of a transducer element is varied to achieve a desired change in the electromechanical coupling coefficient is material dependent. This means that a particular aspect ratio change of an element of one material may affect the coupling coefficient differently than that of another material, when the an element of the other material is subjected to the same aspect ratio change.

Advantage is taken of the elevational subdicing by bidimensionally subdicing the elements longitudinally, and at intervals such that the width of the surface area of the twice subdiced elements in the elevational direction decreases in relation to distance from the center of the element in that direction. In the figures the central subelement has dimensions indicated as 5-2. In this embodiment the central subelement is five units wide in the elevational direction and two units across its longitudinal direction The subelements on either side of the central subelement have dimensions indicated as 4-2, which in this embodiment designates a width of four units in the elevational direction and two units across the longitudinal direction. The subelements extending outward from the center have dimensions which continue to decline in this manner: 3-2, 2-2, and 1-2. It is seen that the aspect ratio of the subelements changes from the central subelement 5-2 to the edge subelements 1-2. The change is symmetrical about the central subelement.

As FIG. 4 shows, all of these subelements have the same thickness T. Thus, the aspect ratios change from the central subelement outward. The changing aspect ratios affect a decline in the electromechanical coupling coefficients of the subelements from the central subelement through those at the edges in the elevational direction. FIG. 4 also shows that the actuating electrodes 21, 23, 26, 24, and 22 are all connected in common by a wire 28 soldered to each subelement. An electrical pulse applied to wire 28 will cause the central subelement (5-2) to transmit a greater intensity of acoustic energy that any other subelement, and the quantum of acoustic energy emitted by the subelements declines as one proceeds to the edges (1-1). Thus, while all subelements are actuated to transmit acoustic energy simultaneously, the profile of the transmitted energy will be concentrated at the elevational center of the element as indicated by large arrow C in comparison with smaller arrows S at the sides of the element, thereby effecting a focusing of the transmitted energy in the elevational direction. The focusing is achieved by the above described selection of the aspect ratios of the subelements.

Each actuating electrode 21–26 extends across all four of subdiced elements e1A–e1D in the longitudinal direction. All of the subelements of element e1 are thus actuated in unison. The subdicing in the elevational direction effects an efficient transfer of electrical actuating energy into acoustic energy, and the varying aspect ratios of the subelements from the center outward focuses the energy in the elevational direction.

In a constructed embodiment, the voids 20 between the subelements can be air filled, or filled with a non piezoelectric bonding compound such as epoxy to retain the subelements in the matrix. FIG. 4 also shows the array backed by a backing of filler material 18 as a damping material.

Figure 5A:
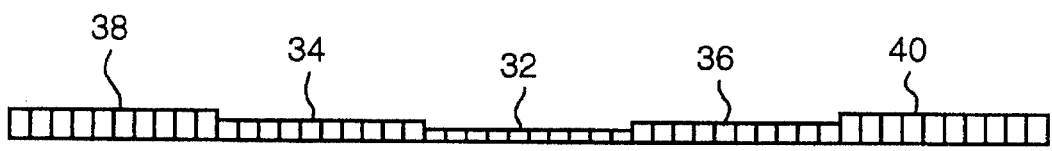
FIG. 5A is an edge view of one technique for fabricating the array of FIG. 5, in which varying thicknesses are employed.
Figure 5:
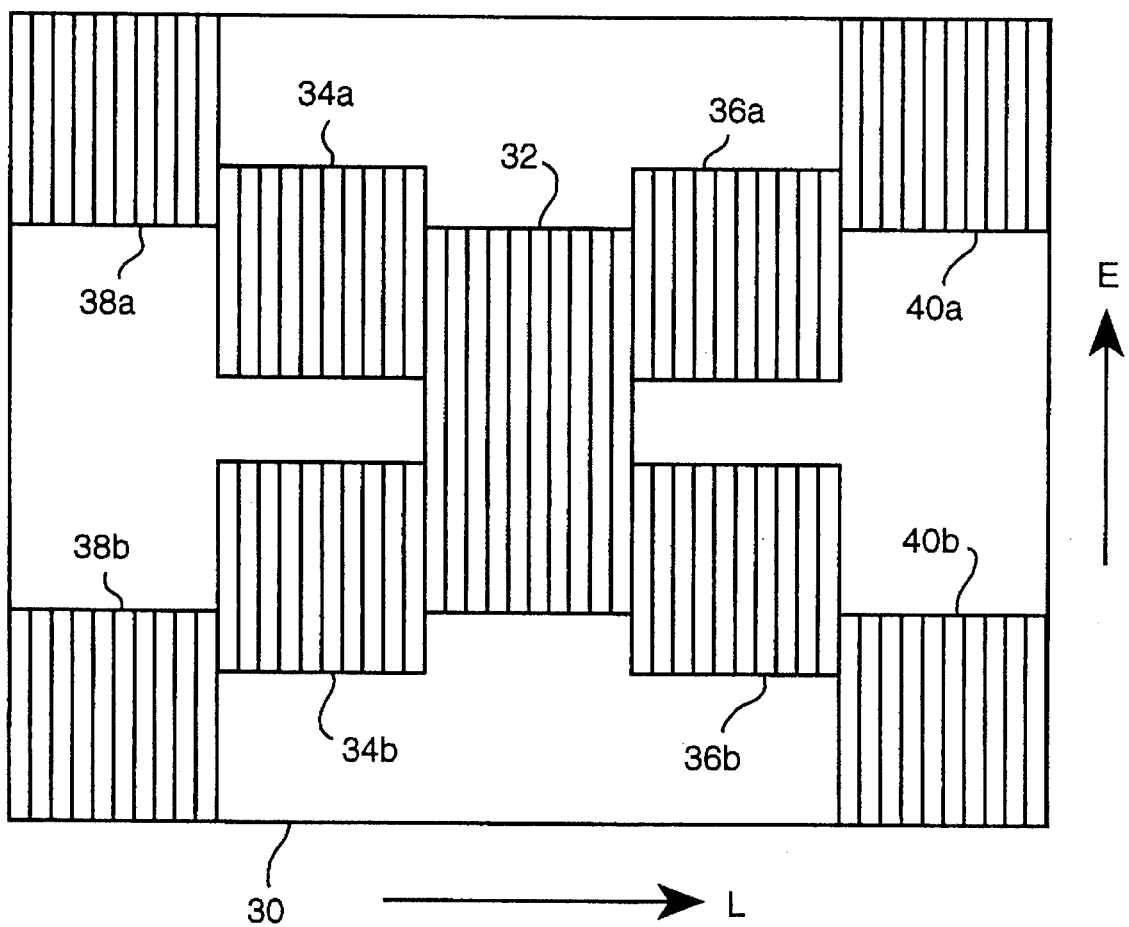
FIG. 5 is a top plan view of a second embodiment of a transducer array which is focused in the elevation direction in accordance with the principles of the present invention.

FIG. 5 illustrates a second embodiment of the present invention which adds several further concepts to achieve elevational focusing. FIG. 4 shows an array 30 comprised of subarrays 32–40. A central subarray 32 is flanked on either side in the longitudinal direction by pairs of subarrays 34a–34b and 36a–36b. Like the embodiment of FIGS. 3 and 4, the central subarray 32 has a greater aspect ratio than any of the flanking subarrays, with the flanking subarrays extending further out in the elevational direction. In addition, the flanking subarray pairs are separated from each other. The subarrays 34a–34b and 36a–36b are flanked in the longitudinal direction by two additional pairs of subarrays, 38a–38b and 40a–40b. The subarrays in each of these pairs are separated by an even greater distance in the elevational direction than are the inner pairs 34a–34b and 36a–36b.

The array 30 is operated by actuating different subarray combinations depending upon the depth of field at which the acoustic beam is to be focused. The aperture of the array is expanded as acoustic waves are transmitted to increasing depths. In the near field the subarray 32 is operated alone, without use of any of the other subarrays. In an intermediate depth of field the flanking subarrays 34a–34b and 36a–36b are used in concert with the central subarray. The addition of these flanking subarrays expands the active aperture of the array and are used together with the central array to focus and steer the transmitted beam in the longitudinal direction through the timed actuation of the individual elements in the subarrays. Elevational focusing is achieved in two ways. First, the greater aspect ratio and electro–mechanical coupling coefficient of the elements of the central subarray 32 cause the central subarray to emit greater acoustic energy than the flanking subarrays for the same level of actuating energy. Second, the separation of corresponding subarrays in the flanking pairs, in combination with a proper excitation time delay, contribute components of acoustic energy which focus the acoustic beam in the elevational direction toward the longitudinal center of the array.

When far field transmission is required all of the subarrays come into play. The aperture of the array 30 is thereby expanded to its maximum in the longitudinal direction. The outermost subarrays 38a–38b and 40a–40b contribute the same elevational focusing effect as the flanking subarrays 34a–34b and 36a–36b, but to an even greater degree by virtue of their even greater outward positions in the elevational direction. Thus, a beam which is focused in both the longitudinal and elevational directions can be transmitted to the maximum operating depth of field of the array 30.

In construction of the array 30, the actuating electrodes of vertically opposing elements of the paired subarrays are connected electrically in common. While the elements of the array may be operated separately at phased actuation times in the longitudinal direction, the corresponding elements of matched subarrays can be actuated in unison to achieve the desired focusing effect in the elevational direction.

Figure 6:
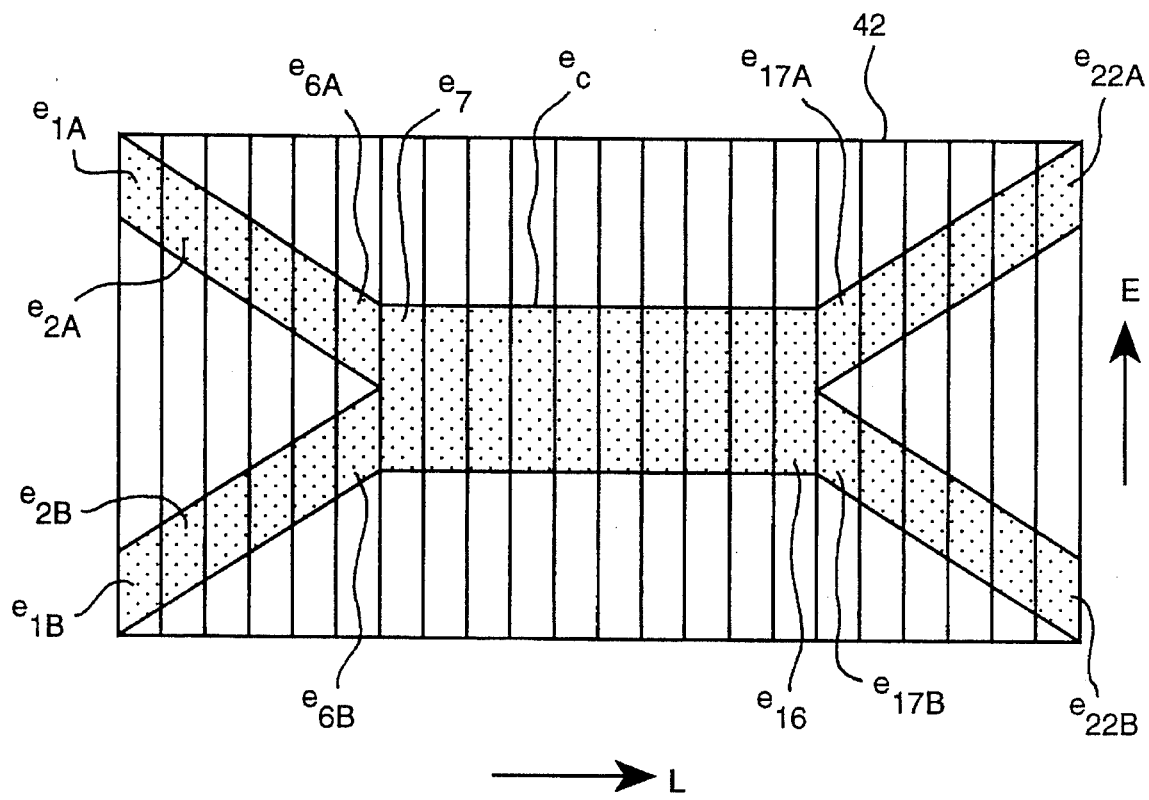
FIG. 6 is a top plan view of a modification of the transducer layout configuration of the array of FIG. 5.
Figure 7:
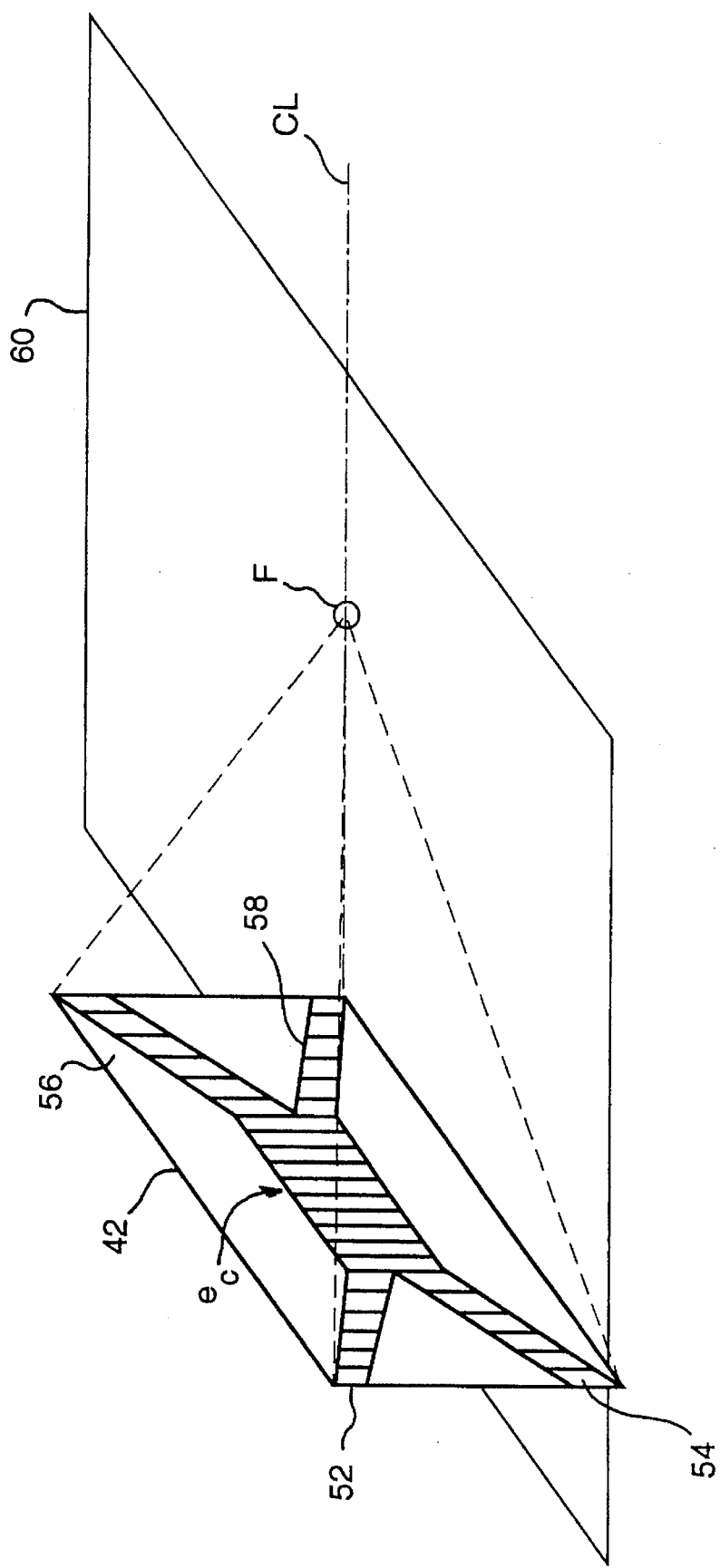
FIG. 7 is a perspective view of the focusing effect of the transducer array of FIG. 6.

A variation of the array 30 of FIG. 5 is shown in the embodiment of FIGS. 6 and 7. In FIG. 6, the outline 42 represents a bar of piezoelectric material which has been diced as indicated by the lines within the outline, but with only the shaded subelements being connected to actuating electrodes and operable. A central subarray $e_c$ extends from element $e_7$ through element $e_{16}$. The central subarray ec is operated when the array transmits acoustic energy in the near field. As the depth of field increases, the longitudinally flanking subelements are added, beginning with subelements $e_{6A}$ and $e_{6B}$, and $e_{17A}$ and $e_{17B}$. With increasing depth of field the other subelements are added, expanding the aperture until the full aperture of $e_{1A},e_{1B}$ through $e_{22A},e_{22B}$ is employed at the greatest depth. Like the previous embodiment, the central subarray elements have a greater aspect ratio than do the paired subelements to provide greater intensity at the center of the array. The outward angular inclination of the pairs of separated subelements gives a gradual increase in the elevational focusing effect of the subelement pairs as the aperture is expanded with increasing depth of field.

These effects are illustrated in the far field in the perspective view of the array 42 and its transmit plane in FIG. 7. The transmit plane 60 is normal to the transmitting face of the array and aligned with its central longitudinal axis. A center line CL of the plane 60 extends from the center of the central subarray $e_c$. In the drawing figure the array 42 is focused at a point F and all of the elements of the array are utilized. To focus the transmitted beam longitudinally, the outermost elements are actuated first, and the sequence of actuation proceeds inwardly until the elements in the center of the array are actuated last. Elevational focusing, which focuses the transmitted beam toward the plane 60, is achieved by the separation of the upwardly extending subelements 52 and their opposition by the downwardly extending subelements 54, and the corresponding separation of subelements 56 and 58. The dashed lines from the corners of the array indicate the effect of this elevational focusing.

Figure 8:
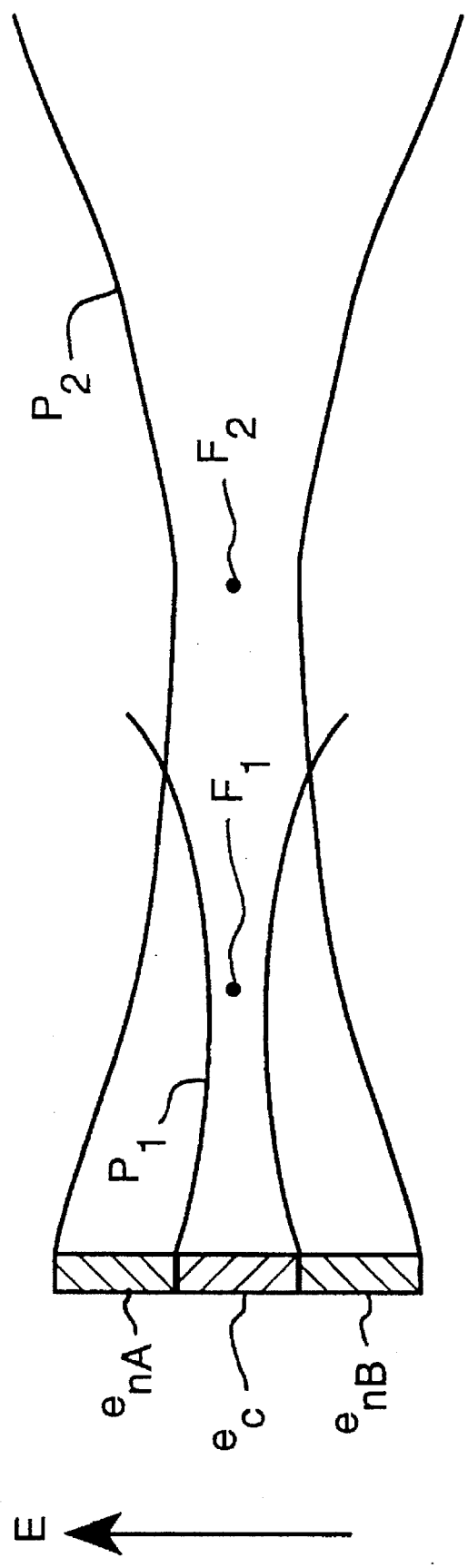
FIG. 8 illustrates the profiles of the transmitted acoustic beams in the elevation dimension of the transducer arrays of FIGS. 5 and 6.

FIG. 8 illustrates exemplary acoustic beam profiles for the embodiments of FIGS. 5–7. In this drawing the transducer array is viewed edge on, with the transmitted beams extending to the right. In the near field the central elements $e_c$ are used alone to focus a beam $P_1$ at a near field focal point $F_1$. The elements $e_c$ in this drawing correspond to the central subarray 32 in FIG. 5 or the central elements $e_c$ in FIG. 6. In the far field the central elements $e_c$ are used together with the outwardly extending paired elements $e_{nA}$ and $e_{nB}$ to produce a beam $P_2$ which is focused at a point $F_2$. The array has good elevational focus characteristics in both the near and the far field.

In the embodiment of FIGS. 6 and 7, like that of FIG. 5, vertically aligned elements (elements which align in the elevational direction) are electrically connected together and operated in unison. If desired, however, the actuating electrodes of the vertically aligned elements can be electrically separated and the elements actuated independently of each other. This would provide the opportunity for deriving additional operational benefits from the array. Referring to FIG. 7 for instance, it would then be possible to actuate the upward extending subelements 52, 56 at a slightly different time than the corresponding downward extending subelements 54, 58. This would cause acoustic energy from the respective extending lines of subelements to arrive at the focal point and return from a target at the focal point at slightly different times and phase relationships. Such timing and phase differences would constitute a spatial compounding of the acoustic beam that would disrupt the usual interaction of acoustic waves that leads to development of the familiar speckle pattern in ultrasonic images. This mode of operation of the array would enable formation of ultrasonic images with reduced speckle content in comparison with simultaneous operation of the opposing subelements.

A second approach to reducing speckle content is illustrated by FIG. 5A, which is an edge-on view of the array of FIG.5. In FIG. 5A the subarrays 32, 34 and 36, and 38 and 40 exhibit different thicknesses, providing the respective subarrays with different frequency responses. The central subarray has the highest frequency response, the subarrays on either side have a lower frequency response, and the outermost subarrays have the lowest frequency response. As the outer subarrays are added to the aperture at increasing depths, the subarrays with the lower frequencies become active, transmitting and receiving ultrasonic signals. When the resulting electrical signals from all active subarrays are combined to form a beam, the differing received signal frequencies are compounded, providing reduced speckle content in the resultant beam.

What is claimed is:

1. A linear array of ultrasonic transducer elements which transmits acoustic beams in a plane extending from a central longitudinal axis of said array, including a plurality of uniform elements arrayed across the full aperture in the longitudinal direction comprising subelements arrayed in the elevational direction and exhibiting varying aspect ratios such that the electro-mechanical coupling coefficients of the subelements vary as a function of their distance from said central longitudinal axis whereby an acoustic beam which varies in intensity in the elevational direction may be produced by said array.

2. The array of ultrasonic transducer elements of claim 1, wherein said array comprises a composite array in which said subelements comprise piezoelectric ceramic material and the interstices between said subelements are filled with a non piezoelectric material.

3. The array of ultrasonic transducer elements of claim 2, wherein said non piezoelectric material comprises an epoxy material.

4. The array of ultrasonic transducer elements of claim 1, wherein all of the subelements of an element of said array have first and second electrodes located on opposite surfaces of said subelements, said first electrodes are electrically coupled in common and said second electrodes are electrically coupled in common.

5. The array of ultrasonic transducer elements of claim 4, wherein said first electrodes are located on the transmitting surfaces of said subelements and are coupled to a reference potential, and said second electrodes are located on the opposite surfaces of said subelements and are coupled to a switched actuating potential.

6. An array of ultrasonic transducer elements which transmits acoustic beams in a plane extending from a central longitudinal axis of said array, including a plurality of elements of uniform electro-mechanical coupling coefficients in the longitudinal direction arrrayed across the full aperture in the longitudinal direction comprising subelements arrayed in the elevational direction, said subelements exhibiting varying aspect ratios such that the electro-mechanical coupling coefficients of the subelements vary as a function of their distance from said central longitudinal axis, whereby an acoustic beam which varies in intensity in the elevational direction may be produced by said array,
wherein said aspect ratios of said subelements vary such that subelements closer to said central longitudinal axis exhibit a greater electro-mechanical coupling coefficient than subelements which are further removed from said central longitudinal axis.

7. The array of ultrasonic transducer elements of claim 6, wherein all of the subelements which are arrayed in a given line in the elevational direction exhibit a common thickness, a common width in said longitudinal direction, and varying lengths in the elevational direction.

8. The array of ultrasonic transducer elements of claim 7, wherein each element of said array comprises a plurality of said lines of subelements which are arrayed in the elevational direction.

9. An array of ultrasonic transducer elements which transmits acoustic beams in a plane extending from a central longitudinal axis of said array, including a plurality of elements which are identical in the longitudinal direction and arrayed in the longitudinal direction comprising subelements arrayed in the elevational direction and exhibiting varying aspect ratios such that the electro-mechanical coupling coefficients of the subelements vary as a function of their distance from said central longitudinal axis, whereby an acoustic beam which varies in intensity in the elevational direction may be produced by said array,
wherein the electro-mechanical coupling coefficients of a line of subelements arrayed in the elevational direction vary as a function of their distance from said central longitudinal axis with subelements more closely located to said central longitudinal axis exhibiting a greater electro-mechanical coupling coefficient than subelements which are further removed from said central longitudinal axis, whereby an acoustic beam which exhibits a greater intensity at the elevational center of said array than at the elevational edges may be produced by said array.

10. A linear array of ultrasonic transducer elements arrayed in the longitudinal direction of said array which transmits acoustic beams in a plane extending from a central longitudinal axis of said array, comprising:
a first group of elements located about the longitudinal center of said array and operable for the transmission of acoustic energy in the near and far fields; and
second and third groups of elements located entirely on opposite sides of said first group of elements in the longitudinal direction, with elements of said second and third groups extending a greater distance in the elevational direction from said central longitudinal axis than said first group of elements, wherein said second and third groups of elements are operable in concert with said first group of elements to provide elevational focusing in the far field.

11. The array of ultrasonic transducer elements of claim 10, wherein each of said second and third groups of elements comprises first and second groups of subelements which oppose each other in the elevational direction and are acoustically separated from each other.

12. The array of ultrasonic transducer elements of claim 11, wherein opposing subelements of said first and second groups of subelements are actuated in common.

13. The array of ultrasonic transducer elements of claim 12, wherein said elements and subelements are separately actuatable from each other in the longitudinal direction for steering and focusing of said beam in the longitudinal direction of said plane.

14. The array of ultrasonic transducer elements of claim 11, wherein the element of said first group exhibit a greater length in the elevational direction than do said subelements of said first and second groups of subelements.

15. The array of ultrasonic transducer elements of claim 11, wherein said first group of subelements of each of said second and third groups of elements is located about a second longitudinal axis of said array which is offset on one side of said central longitudinal axis in the elevational direction, and said second group of subelements of each of said second and third groups of elements is located about a third longitudinal axis of said array which is offset on the opposite side of said central longitudinal axis in the elevational direction from that of said second longitudinal axis.

16. The array of ultrasonic transducer elements of claim 15, wherein said second and third longitudinal axes are symmetrically offset from said central longitudinal axis.

17. The array of ultrasonic transducer elements of claim 11, wherein the subelements of each of said groups of subelements are located along a respective line in the plane of said array which is angled longitudinally outward from a longitudinal side of said first group of elements and angled at an increasing distance from said central longitudinal axis as it extends outward from said first group of elements.

18. The array of ultrasonic transducer elements of claim 11, wherein said elements and subelements are separately actuatable from each other in the longitudinal direction and in the elevational direction for steering and focusing of said beam in the longitudinal direction of said plane and for spatially compounding the transmitted acoustic energy.

19. The array of ultrasonic transducer elements of claim 10, wherein said first group of elements exhibits a higher frequency response than said second and third groups of elements, whereby signals of differing frequency content are received by different groups of elements in the far field.

20. The array of ultrasonic transducer elements of claim 19, wherein said first group of elements exhibits a lesser thickness in the transmission dimension than said second and third groups of elements.

21. An array of ultrasonic transducer elements arrayed in the longitudinal direction of said array which transmits acoustic beams in a plane extending from a central longitudinal axis of said array, comprising:

a first group of elements located about the longitudinal center of said array and operable for the transmission of acoustic energy in the near and far fields; and second and third groups of elements located on opposite sides of said first group of elements in the longitudinal direction, with elements of said second and third groups extending a greater distance in the elevational direction from said central longitudinal axis than said first group of elements, wherein said second and third groups of elements are operable in concert with said first group of elements to provide elevational focusing in the far field, wherein said first group of subelements of each of said second and third groups of elements is located about a second longitudinal axis of said array which is offset on one side of said central longitudinal axis in the elevational direction, and said second group of subelements of each of said second and third groups of elements is located about a third longitudinal axis of said array which is offset on the opposite side of said central longitudinal axis in the elevational direction from that of said second longitudinal axis, further comprising fourth and fifth groups of elements located on opposite sides of said second and third groups of elements, respectively, each of said fourth and fifth groups comprising first and second groups of subelements which oppose each other in the elevational direction, wherein said first group of subelements of each of said fourth and fifth groups of elements is located about a fourth longitudinal axis of said array which is offset on one side of said central longitudinal axis in the elevational direction to a greater degree than said second longitudinal axis, and said second group of subelements of each of said fourth and fifth groups of elements is located about a fifth longitudinal axis of said array which is offset on the opposite side of said central longitudinal axis in the elevational direction from that of said fourth longitudinal axis to a greater degree than said third longitudinal axis.

22. A linear array of ultrasonic transducer elements arrayed in the longitudinal direction of said array which transmits acoustic beams in a plane extending from a central longitudinal axis of said array, comprising a plurality of elements each of which is aligned in parallel in the elevational direction with an adjacent element and exhibiting extension in the elevational direction with respect to said central longitudinal axis which varies in relation to the displacement of said elements from the longitudinal center of the array.

* * * * *